United States Patent
Gentry et al.

(10) Patent No.: US 8,433,298 B2
(45) Date of Patent: *Apr. 30, 2013

(54) ENABLING MID-CALL SERVICES TO BE ADDED TO A COMMUNICATION SESSION BY A WIRELESS DEVICE

(75) Inventors: William Gentry, Raleigh, NC (US); David Tubb, Reading (GB); Raheel Yuhanna, Dallas, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/315,036

(22) Filed: Dec. 8, 2011

(65) Prior Publication Data

US 2012/0083257 A1      Apr. 5, 2012

Related U.S. Application Data

(63) Continuation of application No. 12/556,992, filed on Sep. 10, 2009, now Pat. No. 8,107,932.

(60) Provisional application No. 61/095,657, filed on Sep. 10, 2008.

(51) Int. Cl.
*H04M 3/42* (2006.01)

(52) U.S. Cl.
USPC ........................................ 455/414.1; 455/417

(58) Field of Classification Search ............... 455/414.1, 455/417
See application file for complete search history.

(56) References Cited

U.S. PATENT DOCUMENTS

| | | | |
|---|---|---|---|
| 2003/0235283 A1 | 12/2003 | Knoerle et al. | |
| 2008/0070528 A1* | 3/2008 | Joyner et al. | 455/187.1 |
| 2008/0117893 A1* | 5/2008 | Witzel et al. | 370/352 |
| 2010/0088374 A1* | 4/2010 | Astrom et al. | 709/204 |
| 2010/0144351 A1 | 6/2010 | Witzel et al. | |
| 2010/0260172 A1 | 10/2010 | Bodin et al. | |
| 2011/0075657 A1* | 3/2011 | Chang et al. | 370/352 |
| 2011/0116498 A1 | 5/2011 | Silver et al. | |

* cited by examiner

*Primary Examiner* — Ajit Patel
(74) *Attorney, Agent, or Firm* — Meyertons, Hood, Kivlin, Kowert & Goetzel, P.C.

(57) ABSTRACT

Mid-call services may be added to a communication session such as a telephone call (call session) by a wireless device on a mobile telephone network by causing the wireless device associated with the communication session to invoke a second call session directed to a vertical service code. The second call session is established on the wireless communication network and terminated on the PSTN to an application server associated with the vertical service code. The application server on the PSTN instantiates the service and matches the service associated with the vertical service code on the second call session with the first call session. The application server then applies the mid-call service associated with the vertical service code to the first call session to thus enable mid-call services to be applied to the first call session by the wireless device.

28 Claims, 3 Drawing Sheets

LEGEND
MSC: Mobile Service Center
SCP: Service Control Point

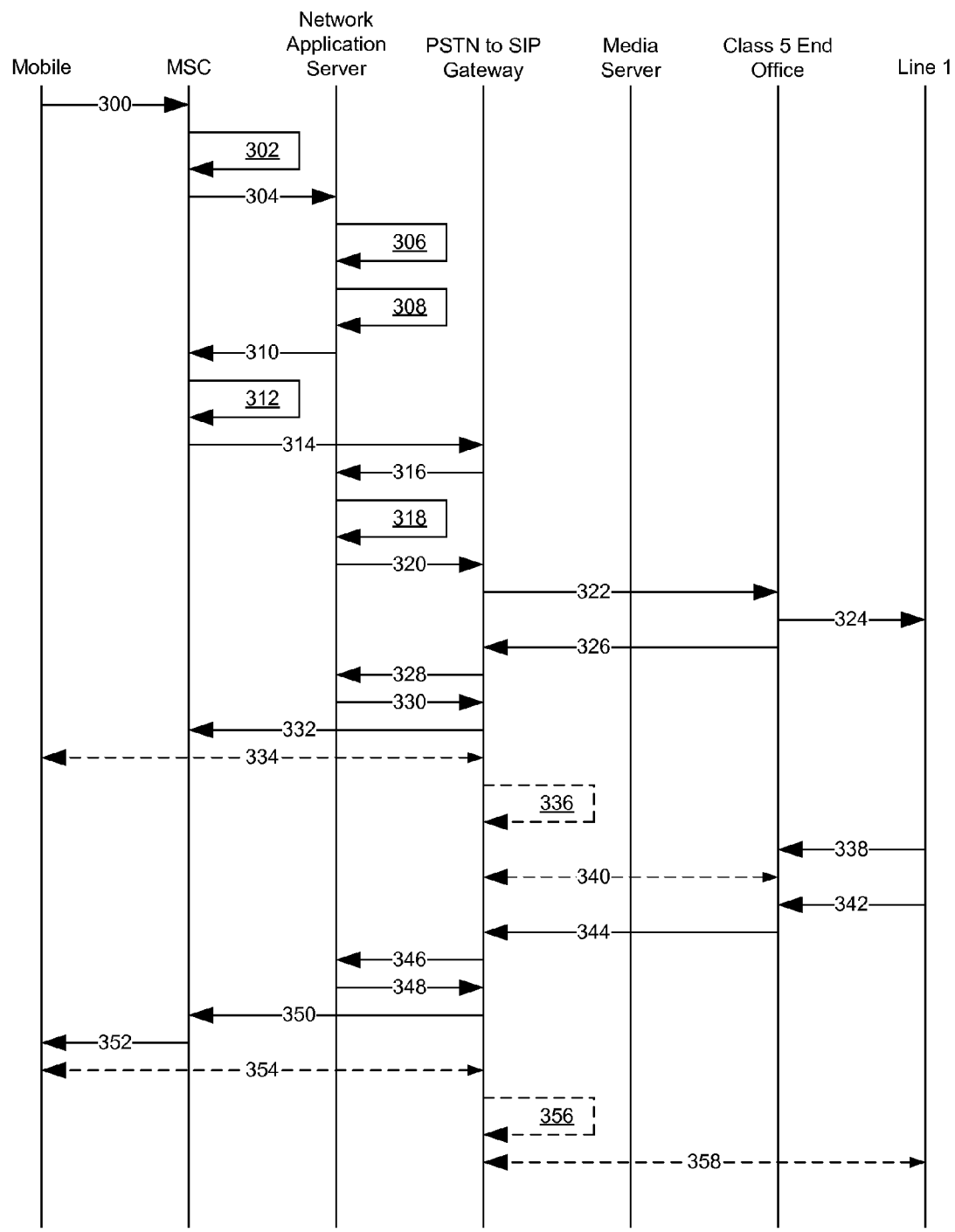

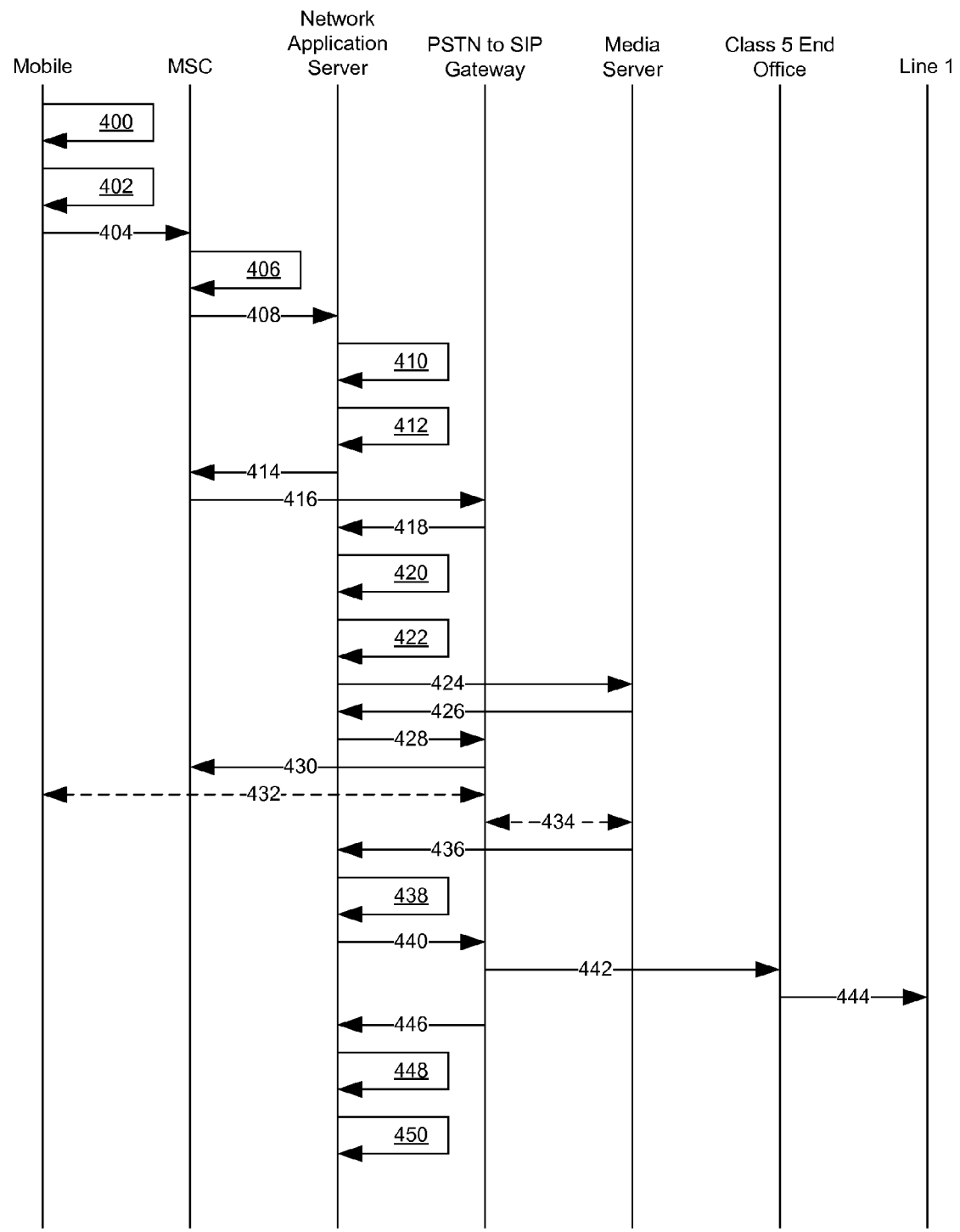

ENABLING MID-CALL SERVICES TO BE ADDED TO A COMMUNICATION SESSION BY A WIRELESS DEVICE

CROSS-REFERENCE TO RELATED APPLICATIONS

This application is a continuation of U.S. patent application Ser. No. 12/556,992, filed Sep. 10, 2009 now U.S. Pat. No. 8,107,932, and also claims the benefit of and priority to U.S. Provisional Patent Application No. 61/095,657, filed Sep. 10, 2008, entitled "Application of Mid-Call Services to a Mobile Device via Independent Call Sessions", the content of each of which is hereby incorporated herein by reference.

TECHNICAL FIELD

The present invention relates to communication networks and, more particularly, to a method of enabling mid-call services to be added to a communication session by a wireless device.

BACKGROUND

Communication services such as voice calls have traditionally been provided via circuit switched (CS) networks, such as the Public Switched Telephone Network (PSTN) or cellular wireless networks. In addition to establishing a circuit for the voice call, network elements on the communication network may provide particular services on the call to enable different functions to be implemented on the call. For example, a user may wish to block caller ID so that, when the call is dialed through to the intended recipient, the user's caller ID may not be viewed. Likewise, a person may wish to have privacy on the call to prevent other third parties from interrupting the call. Many types of services have been developed, and are typically accessed by having the person dial a "vertical service code" when first initiating the telephone call on the network. In the US, vertical service codes are typically invoked by dialing "*" and then a service code number before dialing the telephone number. In other jurisdictions, vertical service codes may require the user to use a different symbol, such as the "#" symbol, or require the user to dial a particular series of digits such as "11".

In addition to invoking services before the call is initiated, other services may be invoked while the call is underway. These services are commonly referred to as "mid-call services". For example, a person on a telephone call may wish to add additional parties to the telephone call. Rather than terminate the first call, the person may seek to add the additional parties to the call by invoking a mid-call service (conference call service) on the existing connection.

Traditionally, services extended to second generation (2G) wireless devices are provided directly by the wireless access network, e.g. by the Mobile Service Center, Home Location Register, and possibly the Service Control Point. Conventionally, mid-call services on a 2G wireless network could be invoked in one of two ways. In the first case, the mid-call service could be invoked using a menu from the phone, such as Unstructured Supplementary Service Data (USSD) techniques within Global System for Mobile communications (GSM) networks. USSD provides a data messaging capability similar to text messaging that is built into the GSM standard.

The second way that mid-call services could be invoked in a 2G mobile network was using in-band DTMF tones. In that scenario, the media path of the active call would be monitored so that any tones applied by the user to activate a mid-call service could be detected and reported to the Mobile Service Center. Although the term "call" will frequently be used herein to refer to a voice communication session, the term "call" is intended to be interpreted in a broader sense to refer to other types of communication sessions as well. For example, the term "call" also encompasses video telephony, streaming media, and other types of communication sessions that may be established by a mobile device on a communication network.

With the advent of fixed mobile convergence, there is a strong desire in the marketplace to be able to deliver a converged set of services to both wireless and wireline devices. This will serve to extend additional services to the mobile user, and do so in such a way that is backwards-compatible to existing 2G mobile devices. This allows additional centrex business services to be extended to mobile devices, and increases the set of mid-call services that are possible to invoke on an existing voice session. However, the traditional mechanisms for invoking mid-call services (noted above) can impose limitations on the solution when used with these new business services. For example, the new service may not be integrated into the service set supported by USSD, or the media resources needed to monitor for in-band DTMF tones may be cost-prohibitive. As the potential set of services grows with new business services in Fixed to Mobile convergence solutions, it would be advantageous to provide a process of enabling mid-call services to be added to a call on a mobile telephone network.

SUMMARY OF THE INVENTION

The following summary is included only to introduce some concepts discussed in the Detailed Description below. This summary is not comprehensive and is not intended to delineate the scope of protectable subject matter which is set forth by the claims presented below.

Mid-call services may be added to a communication session such as a telephone call (call session) by a wireless device on a mobile telephone network by causing the wireless device associated with the communication session to invoke a second call session directed to a vertical service code. The second call session is established on the wireless communication network and terminated on the PSTN to an application server associated with the vertical service code. The application server on the PSTN instantiates the service and matches the service associated with the vertical service code on the second call session with the first call session. The application server then applies the mid-call service associated with the vertical service code to the first call session to thus enable mid-call services to be applied to the first call session by the wireless device.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIGS. 3-4 are signaling diagrams showing the flow of messages between components of the reference network of FIG. 1 in connection with establishing mid-call services on a call from a mobile device operating on a wireless network.

DETAILED DESCRIPTION

Figure 1:
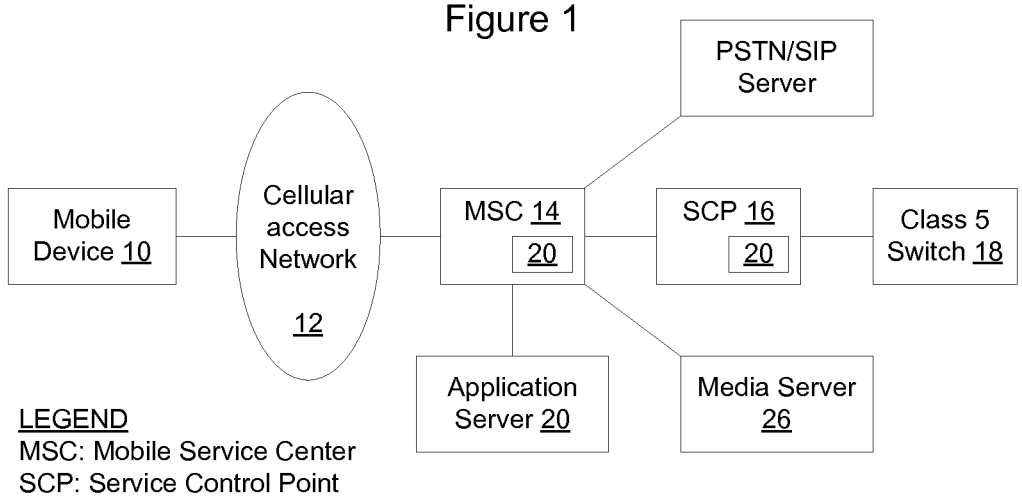
FIG. 1 is a functional block diagram of example reference network showing an example set of functions that may be used to establish a mid-call services on a call from a mobile device operating on a wireless network.

FIG. 1 is a functional block diagram of example reference network showing an example set of functions that may be used to establish a mid-call services on a call from a mobile device operating on a wireless network. As shown in FIG. 1, a mobile device 10 operating on a cellular access network 12 may establish one or more communication sessions over the cellular access network to receive cellular telephone service on the cellular access network. Cellular telephone networks are well known in the art, and my be implemented using any number of wireless communication standards. Several example types of cellular access networks include Global System for Mobile Communications (GSM), General Packet Radio Service (GPRS), Code Division Multiple Access (CDMA), Evolution-Data Optimized (ED-VO), Enhanced Data Rates for GSM Evolution (EDGE), 3GSM, Digital Enhanced Cordless Telecommunications (DECT), Digital AMPS (IS-136/TDMA) and Integrated Digital Enhanced Network (iDEN). Although an example will be described in connection with a GSM cellular access network, the invention is not limited in this regard as the solution described herein may be extended to operate in one or more of these or another type of cellular access network.

Mobile device 10 is a cellular telephone, personal data assistant, or computer implementing a telephony client, or another type of electronic appliance configured to communicate on the cellular access network. Cellular telephones and PDAs having cellular telephone functionality are commonly used to implement voice communication sessions (voice calls) on cellular access networks, but the invention is not limited to an implementation of this nature.

When a cellular call is placed by a mobile device 10 on a cellular access network 12, the call will be connected through a Mobile Services Center (MSC) 14. The mobile service center acts as a gateway between the cellular network and wired networks.

The MSC in the illustrated network is connected to a Service Control Point 16. A Service Control Point (SCP) is a standard component of an Intelligent Network (IN) telephone system which is used to control the provision of services on the network and is frequently involved in routing calls on the network. The SCP enables calls to be routed to various class 5 switches to enable calls to be established on the network.

As shown in FIG. 1, depending on how the network is configured, additional components or functions may be deployed on the network to handle various aspects of the provision of services on the network. For example, if both Signaling System Seven (SS7) and Session Initiation Protocol (SIP) signaling are to be used on the network, then a PSTN/SIP server 24 may be provided to translate between these different signaling formats. SS7 is commonly used on the Public Switched Telephone Network (PSTN) whereas SIP is commonly used to enable Voice over Internet Protocol (VoIP) communication sessions to be established. In the example shown in FIGS. 3 and 4, it has been assumed that the application server utilizes SIP signaling whereas the call setup messages between components of the network utilize SS7 signaling.

The reference network shown in FIG. 1 also includes a media server 26. A media server is useful where it is desirable to play media or collect information from established media channels. The media server may be used, for example, to provide audible information to the user such as to provide audio prompts. The media server may also be used, for example, to collect DTMF (Dual Tone Multi-Frequency) tones or voice responses on an established media channel. For example, if additional information is required from the user, the user may be prompted to input information during the communication session by pressing keys on their handset keypad. The media server may listen for these tones to detect the input from the user. The media server may be used in many contexts as would be known to persons skilled in the art.

Figure 2:
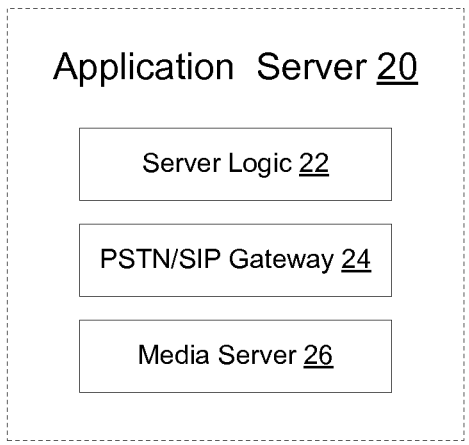
FIG. 2 is a functional block diagram of an example application server that may be used to implement an embodiment.

In the example network shown in FIG. 1, an application server 20 is provided to enable mid-call services to be applied to communication sessions implemented on the cellular access network. The application server may be a stand-alone server containing server logic 22 (see FIG. 2) or may be implemented in one of the other network elements on the network. For example, application server may be implemented as part of the MSC 14 or part of the SCP 16. Likewise, as shown in FIG. 2, the application server may include functional modules to implement the PSTN/SIP gateway 24 and/or media server 26. Thus, the several functions performed by application server 20, PSTN/SIP server 24, and Media Server 26 described in connection with FIGS. 3-4 may be implemented by separate devices or, alternatively, may be implemented by one server on the network. Likewise, as shown in FIG. 1, all of these functions may be implemented in a stand-alone application server or may be implemented in the MSC, SCP or in another network element on the communication network.

Most mobile devices and cellular access networks are capable of establishing more than one simultaneous communication session on the cellular access network. Although the manner in which a call or other communication session may be established on a cellular wireless communication network is well know, FIG. 3 and the following Table I have been provided to show an example way of establishing an initial communication session on a cellular access network. FIG. 4 and the following Table II then show how mid-call services may be added to this established call. As explained in greater detail below, according to an embodiment of the invention, when the user wants to invoke mid-call services on an established communication session, the user will use the mobile device's capability to establish multiple simultaneous communication channels on the wireless network to place a second call (communication session) to a vertical service code within the wired network. This enables the wireless device to utilize the capabilities inherent in the wired network so that the services available on the wired network and made available by the application server 20 may be extended into the wireless cellular access network.

FIGS. 3-4 are signaling diagrams showing the flow of messages between components of the reference network of FIG. 1 in connection with enabling a particular mid-call service to be applied to an existing communication session with a mobile device 10. In particular, the signaling diagram of FIGS. 3-4 show how a call park service can be added to an existing call from a mobile device while that mobile device is currently participating on an existing call on the wireless network. The following table (Table I) summarizes one example set of messages that may be used to establish an initial call. The messages contained in Table I are shown diagrammatically in FIG. 3, and shows how an initial call may be established between a mobile device and a line associated with a first dialed number (DN 1). The functions of these messages will be understandable to a person of ordinary skill in the art. The invention is not limited to this particular embodiment as other signaling flows may be used to establish a call as well, and some of the messages such as the alerting messages may be optional in particular situations. However, for clarity, a brief description of the functions performed by groups of messages will also be set forth below.

TABLE I

| Message Number | Message | Message Description |
|---|---|---|
| 300 | Setup (DN1) | call setup message from mobile device to Dialed Number (DN) 1 |
| 302 | | MSC uses Intelligent Network (IN) signaling to notify application server |
| 304 | ORREQ (DN1) | Origination Request to Dialed Number 1 |
| 306 | | Application server caches DN1 |
| 308 | | Application server generates a Temporary Location Directory Number (TLDN) for Mobile Service Center (MSC) routing |
| 310 | orreq (TLDN) | Origination request response message from application server to MSC |
| 312 | | MSC translates and routes TLDN |
| 314 | IAM (TLDN) | ISUP (ISDN User Part - standard PSTN trunking protocol) Initial Address Message (IAM) identifying the mobile device as the calling party and the TLDN as the called party |
| 316 | INVITE (TLDN, SDPa) | PSTN/SIP server translates ISUP IAM to Session Initiation Protocol (SIP) 100 INVITE message and passes INVITE message to application server. INVITE message identifies TLDN and includes Session Description Parameters (SDP) describing proposed session |
| 318 | | Application Server translates and routes DN1 |
| 320 | INVITE (TLDN, SDPa) | Application Server replies with SIP INVITE |
| 322 | IAM(DN1) | PSTN/SIP server converts INVITE 320 into ISUP Initial Address Message (IAM) and passes IAM to Class 5 switch of end office associated with DN1 |
| 324 | Setup | Class 5 switch issues Setup message to line 1 associated with DN 1 |
| 326 | ACM | Class 5 switch issues ISUP Address complete message to PSTN/SIP gateway |
| 328 | 183 Session Progress (SDPb) | PSTN/SIP gateway generates SIP 183 message indicating that the session is in progress, and carrying Session Description Protocol Parameters b. |
| 330 | 183 Session Progress (SDPb) | Application server responds with SIP 183 message |
| 332 | ACM | PSTN/SIP gateway issues ISUP Address complete message to Mobile Services Center |
| 334 | TDM media channel established | Other types of media channels may be established as well. Audible ring-back tone presented to user of mobile device to indicate that call is ringing through to DN 1 |

TABLE I-continued

| Message Number | Message | Message Description |
|---|---|---|
| 336 | | PSTN/SIP gateway establishes VoIP Real-time Transport Protocol (RTP) Media path |
| 338 | Alerting | Message from Line 1 to class 5 switch that alerting has begun on handset |
| 340 | | TDM media (audible ringback) |
| 342 | Answer | Handset on line 1 taken off-hook |
| 344 | ANM | Class 5 switch issues ISUP Answer Message (ANM) to PSTN/SIP gateway |
| 346 | 200 OK (SDPb) | SIP 200 OK message passed to application server |
| 348 | 200 OK (SDPb) | Application server responds with SIP 200 OK message |
| 350 | ANM | PSTN/SIP gateway issues ISUP Answer Message (ANM) to MSC |
| 352 | Answer | MSC notifies mobile that the call has been answered |
| 354 | | TDM media path for first call established from Mobile device to PSTN/SIP gateway |
| 356 | | VoIP RTP media path established at PSTN/SIP gateway |
| 358 | | TDM media path for first call established from PSTN/SIP gateway through class 5 switch to line 1 associated with DN 1 |

In the example shown in FIG. 3, the user would of the mobile phone would like to initiate a communication session with Directory Number (DN) 1 associated with line 1. The Directory Number could be a public number or a private extension. Public numbers generally conform to the public dialing plan for the geographic area where the service is being provided (e.g. 10 digit numbers in North America). Private extensions could be of varying length depending on the size of the enterprise (e.g. 4 digit dialing to another user within the enterprise, or dialing 9 plus a public number to dial outside of the enterprise). Thus, the dialed number may have a larger number of digits. However, to simplify discussion the directory number of the telephone call is simply referred to herein as DN1.

To place a call, the mobile issues a call setup message (300). The initial call setup message is received by the MSC and is signaled through to the called line 1 (messages 302-324). When the setup message is issued on the called line, acknowledgment messages are returned (messages 326-332) and a media path is set up with the mobile device (334-336). Alerting is then initiated on the called line (338) and, when the other person answers the call by taking their handset off-hook (342), associated answer messages are exchanged (messages 344-352). This enables the media path to be extended to the class 5 switch and, hence, to the called line 1 (354-358). Establishment of calls in this manner from a wireless device to a land line supported by a class 5 switch is well known in the art and the invention is not limited to a communication session established by the example provided in connection with FIG. 3 and Table I.

The following table (Table II) summarizes the messages used in the signaling diagram of FIG. 4 and shows how a mid-call service may be added to an established call with a mobile device, such as the call established and described above in connection with FIG. 3 and Table I. In particular, FIG. 4 shows how a call park mid-call service may be added to the existing communication session. The functions of these messages will be understandable to a person of ordinary skill in the art. However, for clarity, a brief description of the functions performed by groups of messages will also be set forth below.

TABLE I

| Message Number | Message | Message Description |
|---|---|---|
| 400 | | Mobile device invokes Vertical Service Code by dialing Vertical Service Code (VSC) on keypad of mobile device |
| 402 | | Mobile initiates second communication session on wireless network |
| 404 | Setup (*VSC) | call setup message from mobile device to Vertical Service Code placed on wireless network and received by MSC |
| 406 | | Intelligent Network signaling used to notify application server |
| 408 | ORREQ(*VSC) | Origination Request to Dialed Vertical Service Code *VSC |
| 410 | | Application server caches the vertical service code *VSC |
| 412 | | Application server generates a Temporary Location Directory Number (TLDN) for Mobile Service Center (MSC) routing |
| 414 | orreq (TLDN) | Origination request response message from application server to MSC |
| 416 | IAM (TLDN) | ISUP Initial Address Message (IAM) identifying the mobile device as the calling party and the TLDN of the vertical service code as the called party |
| 418 | INVITE (TLDN, SDPa) | PSTN/SIP server translates ISUP IAM to Session Initiation Protocol (SIP) 100 INVITE message and passes INVITE message to application server. INVITE message identifies TLDN of Vertical Service Code and includes Session Description Parameters (SDP) describing proposed session |
| 420 | | Application server retrieves Vertical Service Code and begins execution of services |
| 422 | | Application Server allocates server resources |
| 424 | Allocate (SDPa) | Application Server sends Allocate message including Session Description Parameters to Media Server |
| 426 | SDPms | Media Server responds with Session Description Parameters |
| 428 | 183 Session Progress | Network Application Server sends SIP 183 message indicating that the session is in progress to PSTN/SIP server |
| 430 | ACM | ISUP Address Complete Message sent to MSC |
| 432 | | TDM media channel established between Mobile and PSTN/SIP Gateway. Other types of media channels may be established as well. |
| 434 | | VoIP RTP media channel established |
| 436 | | Additional digits collected in-band on media channel by media server from mobile device; additional digits passed to application server to identify call park destination |
| 438 | | Application server identifies and parks initial call leg |
| 440 | re-INVITE(HOLD, assigned to parking lot) | Message from Network Application Server to PSTN/SIP gateway |
| 442 | | Media path for line 1 placed on hold; Class 5 switch notified that call is on hold |
| 444 | | Media path for line 1 placed on hold |
| 446 | 200 OK | SIP 200 OK message acknowledging that media path is on Hold |
| 448 | | Application Server applies confirmation treatment to mobile over existing media path |
| 450 | | Application Server releases call legs to mobile (release messages follow normal release sequence) |

As noted above, the mobile user may want to add services to an existing communication session. For example, the user may want to park the communication session and later retrieve the communication session. Call park is a feature that enables the call to be put on hold for a period of time and later re-connect to the communication session. Re-connection may be initiated by the mobile device or may be initiated by the application server. For example, it is not uncommon for a user to be placed on hold for an extended period of time when the user is required to speak to a company representative in a call center. Call park may be used in this instance to enable the call to be parked until the customer service representative is actually on the line. Once the customer service representative at the call center answers the call, the mobile user may be notified to re-connect to the communication session. In this example, the application server may initiate re-connect so that the mobile device user may be re-connected to the parked communication session.

In other scenarios the mobile user may wish to park a communication session and re-join the communication session at a later time. For example, if the user is on a normal telephone call or a telephone conference call the user may want to step off the call for a short period of time and then re-join. The user may park the initial communication session and then later initiate re-joining of the initial communication session. This enables the user to temporarily exit the initial communication session and then later re-join the same session without terminating the initial communication session.

Although FIG. 4 and Table II show an example application of a call park mid-call service to an existing communication session, the invention is not limited to this particular example but also extends to other mid-call services. Example mid-call services that may be invoked include call transfer to cause the call to be re-directed to another user, call conferencing to enable the mobile user to dial another person and add them to the existing communication session, and call pickup to enable another incoming call to be added to the existing communication session. Additionally, activation or deactivation of mid-call services could also be performed, such as call forwarding or call screening capabilities. Other types of mid-call services may be applied as well and the invention is not limited to these particular mid-call services or to the particular example shown in connection with FIG. 4 and Table II. Likewise, although a focus has been provided on activating mid-call services, using a second connection directed to a vertical service code may also be used to remove services from the call mid-call.

According to an embodiment of the invention, to invoke mid-call services, the mobile user will establish a new connection on the wireless network to a vertical service code that identifies the mid-call service to be applied to the existing connection. In the example shown in FIG. 4 and Table II, the mobile user would like to invoke call park. In the illustrated example the mid-call service is identified by *VSC. Vertical Service Codes are typically identified using the * key followed by a particular code. The particular vertical service codes used by a network operator may vary. For example, call back is commonly identified with vertical service code *69. However, if a telephone company wished this could be reassigned to any other selected code. Accordingly, the generic vertical service code *VSC has been used herein to specify call park mid-call service. The mobile user may invoke other mid-call services as well using different vertical service codes, and the invention is not limited this particular example.

Mobile devices are commonly implemented to enable a mobile user to set up multiple simultaneous (e.g. two) connections on the mobile network. For example, in some mobile devices the user may press a combination of keys such as the send key, the digits for the intended destination number, and then re-press the send key. By pressing the send key both before and after the dialed digits, the digits are not transmitted in-band on the existing connection as DTMF signals but are rather stored on the mobile device. When the user presses the send key a second time, the mobile device will send the dialed digits out-of-band onto the mobile network to initiate a second connection for the mobile device on the wireless network. Other mobile devices may use other combinations of keys to instruct the mobile device to establish a second communication channel on the cellular access network, rather than sending DTMF tones on the current communication session.

When the mobile service center (MSC) receives the setup request (404) from the mobile phone, it will recognize the setup request as being directed to a vertical service code and will initiate signaling to enable the call to be connected to an application server. The application server in one embodiment is an application server that is implemented on the wired communication network, e.g. on the Public Switched Telephone Network, to provide services on the wired communication network. Messages (406-418) shown in FIG. 4 and Table II are associated with forwarding this request for vertical services to the application server responsible for providing the requested services.

At (420-426) the application server initiates application of the services to the existing call and allocates media services for the mid-call service. In this example, the application server will cause an application to be launched or an instance of the application to be launched which will correlate the services invoked via the second call session with the original call session associated with the mobile user.

As noted above, in this case, the services to be applied are to initiate call park. In connection with providing this mid-call service it may be desirable or necessary to collect additional information from the mobile user. Accordingly, a media path will be established on the second connection (428-434) between the mobile device and a media server. This media path enables the media server to interact with the user to collect additional input in the form of additional digits or audio responses from the mobile user. For example, the media server may include a DTMF module to collect DTMF codes associated with typed input on the user's mobile phone dial pad. Likewise the media server may include a voice recognition module to enable user's responses to prompts to be recognized. In addition to having an interface accessible over the second communication session, the media server may also include a web services interface which may be leveraged between the application server and other clients (e.g. client on the mobile phone) to orchestrate the service behavior. In a call park context, for example, the media server may provide the user with information about how to retrieve the call at a later time or may provide the user with an opportunity to indicate how long the call should remain parked before the communication session is terminated.

Once all necessary information has been exchanged on the media session associated with the second communication session, the initial communication session will be parked by the application server (438). This will cause the media path for the initial communication session to be placed on hold (440-446), which will be acknowledged to the mobile device (448). Acknowledgement that the mid-call services have been applied to the initial communication session may be provided by audible tones or announcements on either the initial communication session or the second communication session.

When the initial communication session is parked, the portion of the communication session extending to the mobile device will be released (450). If the user later decides to re-join the initial communication session the user may do so by initiating yet another communication session on the cellular access network (via the same mobile device or via a different mobile device) or may initiate a new communication session on the wired network. The particular manner in which the user may re-join the original communication session will be implementation dependant and is well known in the art. Accordingly, a detailed discussion of this aspect of implementing the call park service has been omitted.

As illustrated in this example, the application of network based mid-call services to a GSM or CDMA mobile device is facilitated through the invocation of a second call session from the mobile device. In this scenario, the mobile is involved in an active call session, and wants to invoke a service to apply to that session. The mobile may initiate a new session to a vertical service code that's used to initiate the mid-call service. This code is ultimately delivered to a network-based application server which can correlate the service request to the active call session, perform any function associated with the service, and provide feedback to the user through acknowledgement tones or announcements.

Accordingly, a second parallel call session is created which is used to invoke a network-based mid-call supplementary service on the existing call. With this approach, the mobile initiates a new call session, just like it would if it were dialing the third party of a three-way conference. However, instead of dialing the directory number of the third party, it dials a vertical service code to invoke the service. This vertical service code is received by the serving MSC, which either resolves it locally or interacts with an offboard device (such as an SCP) to determine how the call should be routed to the associated application server. The MSC and/or SCP can prefix steering digits to the vertical service code to facilitate routing it to the application server via traditional network interconnect trunks or, alternatively, digits within the vertical service code may be substituted or removed in order to facilitate routing over the interconnect trunking network.

The MSC or offboard device (such as an SCP) then interacts directly with the network-based application server to provide a response to the service request. Likewise, as shown in FIG. 1, the MSC or SCP may have the relevant logic instantiated as a separate process running within the server providing the MSC/SCP functionality on the network. The invention is not limited to the particular manner in which these functions are hosted on the network as it is common for multiple network functions to be hosted in the same server.

Likewise, networks frequently include multiple instances of the same function to enable redundancy to be implemented on the network. Thus, there may be multiple MSC, SCP, application servers, etc., on the network, any combination of which may interact to provide the mid-call services as described above.

The application server, MSC, and SCP can interact with each other using any protocol appropriate for the function, including session based protocols (such as SIP), web-based protocols (such as http), or any other transaction-based protocol. When the application server receives a notification to provide mid-call services, it can either perform the necessary function directly, or (depending on the nature and complexity of the service) respond that the new session should be routed directly to it. Where the new session is to be routed directly to the application server, a steering or routing number (much like a TLDN in existing wireless networks) is generated and communicated to the serving MSC to route the call. As the application server is addressing the service request, it will perform operations on the existing active call or record and communicate information associated with the active call session. After this has been completed, an acknowledgement can be provided to the mobile device on the second session (typically through a tone or announcement, but not limited to that), and the second call session is released.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of enabling a mid-call service to be added to a first communication session established with a wireless device, the method comprising:
   enabling the wireless device to establish the first communication session on a wireless communication network;
   enabling the wireless device to establish a second communication session on the wireless communication network, wherein the second communication session is associated with a vertical service code identifying the mid-call service to be added to the first communication session;
   instantiating the mid-call service identified by the vertical service code on the second communications session; and
   applying the identified mid-call service to the first communication session.

2. The method of claim 1, wherein enabling the wireless device to establish the second communication session comprises establishing the second communication session with a Mobile Service Center.

3. The method of claim 1, wherein enabling the wireless device to establish the second communication session comprises establishing the second communication session with a Service Control Point.

4. The method of claim 1, wherein enabling the wireless device to establish the second communication session associated with the vertical service code causes the vertical service code to be conveyed to an application server.

5. The method of claim 4, wherein the application server applies the identified mid-call service to the first communication session.

6. The method of claim 5, wherein the application server correlates with the first communication session the vertical service code associated with the second communication session.

7. The method of claim 5, wherein the application server provides feedback to the wireless device that the mid-call service has been applied to the first communication session.

8. The method of claim 7, wherein the feedback is audible.

9. The method of claim 7, wherein the feedback is provided via the first communication session.

10. The method of claim 7, wherein the feedback is provided via the second communication session.

11. A system for enabling a mid-call service to be added to a first communication session established with a wireless device, the system comprising a mobile services center (MSC) configured:
    to enable the wireless device to establish the first communication session on a wireless communication network;
    to enable the wireless device to establish a second communication session on the wireless communication network, wherein the second communication session is associated with a vertical service code identifying the mid-call service to be added to the first communication session;
    to instantiate the mid-call service identified by the vertical service code on the second communications session; and
    to apply the identified mid-call service to the first communication session.

12. The system of claim 11, wherein the MSC is configured to enable the wireless device to establish the second communication session by establishing the second communication session with the MSC.

13. The system of claim 11, wherein the MSC is configured to enable the wireless device to establish the second communication session by establishing the second communication session with a service control point (SCP).

14. The system of claim 11, wherein the MSC is configured to convey the vertical service code to an application server while enabling the wireless device to establish the second communication session.

15. The system of claim 14, further comprising the application server, the application server being configured to apply the identified mid-call service to the first communication session.

16. The system of claim 15, wherein the application server is configured to correlate with the first communication session the vertical service code associated with the second communication session.

17. The system of claim 15, wherein the application server is configured to provide feedback to the wireless device on the first communication session that the mid-call services have been applied to the first communication session.

18. The system of claim 17, wherein the application server is configured to provide audible feedback.

19. The system of claim 17, wherein the application server is configured to provide the feedback via the first communication session.

20. The system of claim 17, wherein the application server is configured to provide the feedback via the second communication session.

21. A network server for connection to a wireless communication network to facilitate provision of a mid-call service to a mobile device communicating via the wireless communication network, the network server comprising:
- call signaling reception logic configured to receive call signaling from a mobile device associated with a first communication session over a cellular communication network;
- vertical service code identification logic configured to determine that the call signaling comprises a vertical service code associated with a mid-call service; and
- call signaling direction logic configured to forward call signaling information associated with the mid-call service to an application server;
- wherein the received call signaling is received via a second communication session initiated by the mobile device; and
- wherein the vertical service code is associated with the second communication session and the call signaling reception logic is configured to correlate the vertical service code with the first communication session.

22. The network server of claim 21, wherein the network server is a mobile services center (MSC).

23. The network server of claim 21, wherein the network server is a service control point (SCP).

24. An application server for providing a mid-call service to a mobile device communicating via a wireless communication network, the application server comprising:
- call signaling reception logic configured to receive call signaling associated with a first communication session of the mobile device, the call signaling comprising information associated with the mid-call service; and
- mid-call service application logic configured to apply the mid-call service to the first communication session,
- wherein the received call signaling is received via a second communication session initiated by the mobile device, and
- wherein the received call signaling comprises information indicative of a vertical service code associated with the second communication session, and the call signaling reception logic is configured to correlate the vertical service code with the first communication session.

25. The application server of claim 24, further comprising feedback logic configured to provide feedback to the wireless device that the mid-call service has been applied to the first communication session.

26. The application server of claim 25, wherein the feedback logic is configured to provide audible feedback.

27. The application server of claim 25, wherein the feedback logic is configured to provide the feedback via the first communication session.

28. The application server of claim 25, wherein the feedback logic is configured to provide the feedback via the second communication session.

* * * * *